(12) United States Patent
Karpekin et al.

(10) Patent No.: US 11,808,138 B2
(45) Date of Patent: Nov. 7, 2023

(54) GAS PRESSURE MEASUREMENT WITHIN CASED WELLBORE SYSTEMS AND METHODS

(71) Applicant: Schlumberger Technology Corporation, Sugar Land, TX (US)

(72) Inventors: Yevgeniy Karpekin, Moscow (RU); Heri Tanjung, Jakarta (ID); Ashish Datey, Camberwell (AU); Gustavo Dip, Buenos Aires (AR); David Rose, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 207 days.

(21) Appl. No.: 17/287,542

(22) PCT Filed: Oct. 24, 2019

(86) PCT No.: PCT/US2019/057811
§ 371 (c)(1),
(2) Date: Apr. 22, 2021

(87) PCT Pub. No.: WO2020/086813
PCT Pub. Date: Apr. 30, 2020

(65) Prior Publication Data
US 2021/0318461 A1 Oct. 14, 2021

Related U.S. Application Data

(60) Provisional application No. 62/749,978, filed on Oct. 24, 2018.

(51) Int. Cl.
*E21B 47/06* (2012.01)
*G01V 5/10* (2006.01)

(52) U.S. Cl.
CPC .............. *E21B 47/06* (2013.01); *G01V 5/102* (2013.01)

(58) Field of Classification Search
CPC ........... E21B 47/06; G01V 5/10; G01V 5/102
See application file for complete search history.

(56) References Cited

U.S. PATENT DOCUMENTS

| | | | |
|---|---|---|---|
| 5,235,185 | A | 8/1993 | Albats et al. |
| 7,361,887 | B2 | 4/2008 | Trcka et al. |

(Continued)

FOREIGN PATENT DOCUMENTS

| | | |
|---|---|---|
| WO | 2007015953 A2 | 2/2007 |
| WO | 2011086145 A1 | 7/2011 |

OTHER PUBLICATIONS

International Preliminary Report on Patentability issued in the PCT Application PCT/US2019/057811 dated May 6, 2021, 8 pages.

(Continued)

*Primary Examiner* — Brad Harcourt
(74) *Attorney, Agent, or Firm* — Frederick Carbone

(57) ABSTRACT

A method for determining the gas pressure may include generating, via a downhole tool, neutron radiation in a cased wellbore of a geological formation and measuring a response to the neutron radiation. The method may also include determining, via a processor, at least one of a sigma, a neutron porosity, or a fast-neutron cross-section of the formation. Additionally, an equation of state of the gas may be estimated, and a gas pressure of the gas may be determined by solving a relationship, based at least in part on the equation of state, between the gas pressure and the at least one of the sigma, the neutron porosity, or the fast-neutron cross-section.

17 Claims, 7 Drawing Sheets

(56) References Cited

U.S. PATENT DOCUMENTS

| | | | |
|---|---|---|---|
| 2007/0023626 A1* | 2/2007 | Riley | G01V 5/102 |
| | | | 250/269.6 |
| 2011/0282818 A1 | 11/2011 | Chen et al. | |
| 2013/0234012 A1 | 9/2013 | Morris et al. | |
| 2014/0076632 A1* | 3/2014 | Wessling | E21B 47/06 |
| | | | 175/48 |
| 2016/0222741 A1* | 8/2016 | Lovorn | E21B 34/00 |
| 2020/0150306 A1* | 5/2020 | Han | E21B 47/00 |

OTHER PUBLICATIONS

McKeon, D. C., and Scott, H. D., 1989, SNUPAR—A nuclear parameter code for nuclear geophysics applications: IEEE Transactions on Nuclear Science, 36(1), 1215-1219.

Rose, D., Zhou, T., Beekman, S., Quinlan, T., Delgadillo, M., Gonzalez, G., Fricke, S., Thornton, J., Clinton, D., Gicquel, F., Shestakova, I., Stephenson, K., Stoller, C., Philip, O., La Rotta Marin, J., Mainier, S., Perchonok, B., and Bailly, J.-P., 2015, An Innovative Slim Pulsed Neutron Logging Tool, Paper XXXX, Transactions, SPWLA 56th Annual Logging Symposium, Long Beach, California, USA, Jul. 18-22. (23 pages).

Thomson, J. C., & Klimo, C. R. (Jan. 1, 1990). Pulsed Neutron Log Interpretation Case Histories From Inland and Offshore South Louisiana. Society of Petroleum Engineers, SPE20587 (13 pages).

Bertoli, S., Borghi, M., Galli, G., Oprescu, A., & Riley, S. (Mar. 20, 2013). Field Trials of a new Array Pulsed Neutron Formation Gas Measurement in Complex Completions. Offshore Mediterranean Conference (10 pages).

Marsh, R., Ansari, R., Chace, D., Boyle, K., (Jun. 2010), Application of New Pulsed Neutron Technology In the Low Porosity, Low Salinity Cooper Basin of South Australia, 2010-33210 SPWLA Conference Paper. (16 pages).

Bartelucci, P., Borghi, M., Crottini, A., Galli, G., Pirrone, M., Rizzo, G., . . . Zhang, Q. (May 10, 2017). Pressure Depletion Evaluation Behind Casing Using Pulsed Neutron Technology: An Application in a Multi-Layer Gas Reservoir in Eastern "Pianura Padana" Basin. Offshore Mediterranean Conference (14 pages).

International Search Report and Written Opinion issued in the PCT Application PCT/US2019/057811, dated Feb. 12, 2020 (11 pages).

* cited by examiner

GAS PRESSURE MEASUREMENT WITHIN CASED WELLBORE SYSTEMS AND METHODS

CROSS REFERENCE PARAGRAPH

This application claims the benefit of U.S. Provisional Application No. 62/749,978, entitled "GAS PRESSURE MEASUREMENT WITHIN CASED WELLBORE SYSTEMS AND METHODS," filed Oct. 24, 2018, the disclosure of which is hereby incorporated herein by reference.

BACKGROUND

This disclosure relates to using neutron generator based measurements to determine environmental properties, such as gas pressure, of a formation surrounding a cased wellbore.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a relatively complex endeavor. In many cases, decisions involved in hydrocarbon exploration and production may be informed by measurements from downhole tools that are conveyed deep into the wellbore. The measurements may be used to infer properties and characteristics of the geological formation surrounding the wellbore. The discovery and observation of resources using downhole techniques generally takes place down in the wellbore via one or more downhole tools. These tools may be a part of a tool-string lowered into an open or cased wellbore.

In some instances, a downhole tool may make direct gas pressure measurements by utilizing one or more gas pressure sensors at a location of interest within the wellbore. However, in some instances, a wellbore casing may reduce the efficacy of such sensors, without, for example, time and resource consuming perforations in the casing at the location of interest. As such, it may be advantageous to have an accurate way of determining the gas pressure at the location of interest without perforating the casing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Production of a geological formation may be directly affected by the gas pressure in the formation at the location of extraction within a wellbore. For example, a higher gas pressure may result in higher rates of production of the natural resources within the formation. In general, gas pressure measurements are usually obtained in an open wellbore environment and/or, if the wellbore is cased, at locations of perforations in the casing. However, once the wellbore is cased, it may become difficult to obtain direct gas pressure measurements of the formation at different locations within the wellbore. For example, it may be desired to take gas pressure measurements at multiple locations in the wellbore without perforating the casing at each location.

Estimating the gas pressure within the formation without perforating the casing may, for example, provide much needed information about future production, increase production efficiency, and/or reduce expenditures, both time and resources. To obtain such an estimate, in one embodiment, a downhole tool utilizing a PNG may be placed at a location within a wellbore to obtain one or more independent measurements such neutron porosity, a neutron capture cross-section (sigma), and a fast-neutron cross-section (FNXS). Each of the measurements may be used, along with assumed properties of the formation, to obtain an estimate of the gas pressure at the location the measurements were obtained. Furthermore, the estimate from each of the independent measurements may be compared for congruency. If the estimates agree with each other, the confidence in the estimate may be increased, and if the estimates do not agree, one or more of the assumptions may be altered and the estimates recomputed. The estimated gas pressure may be used to determine if production at a specific location within the formation should be accomplished and/or to determine the most effective location within the wellbore to initiate production.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure, alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
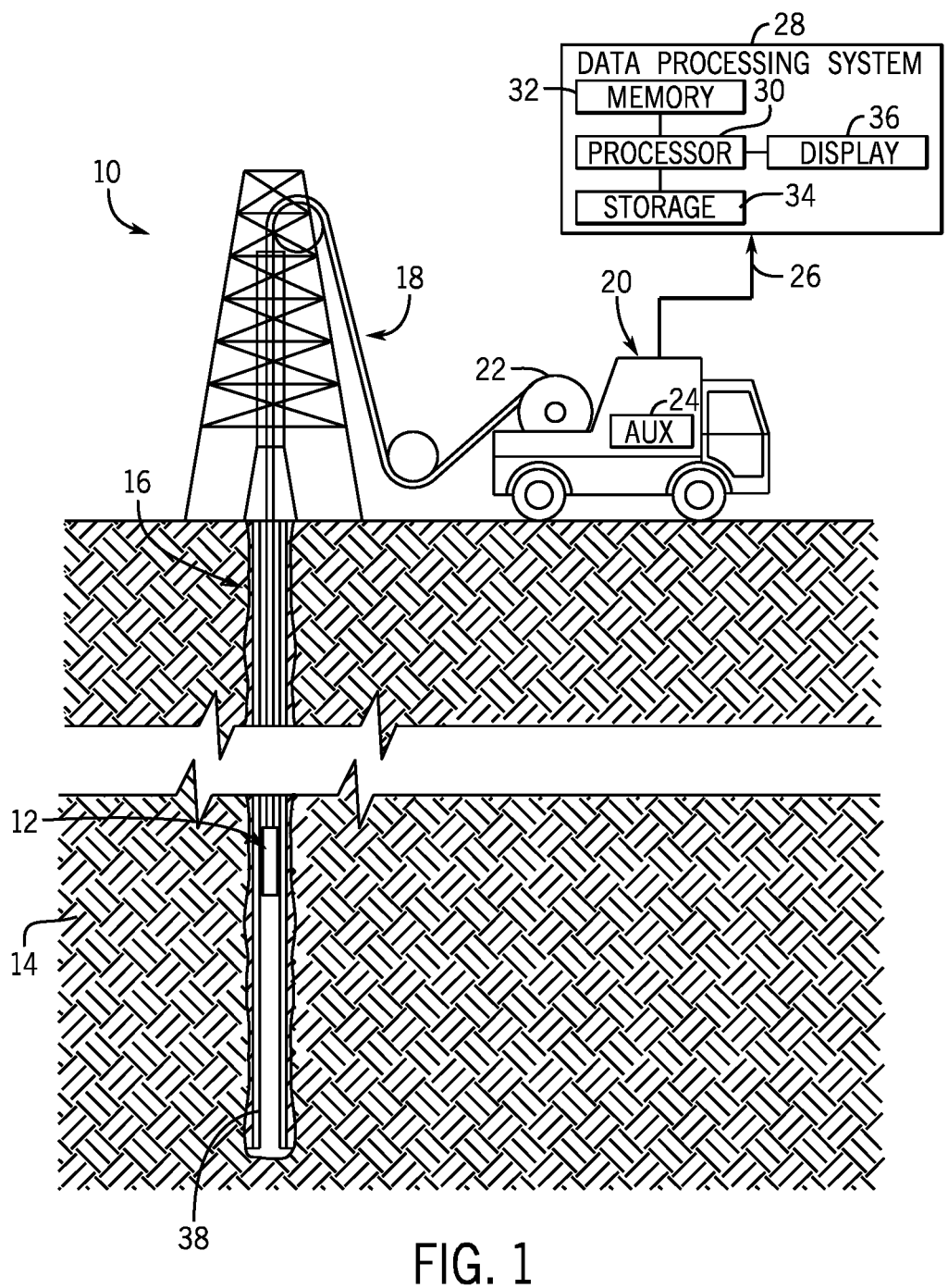
FIG. 1 is an example of a radiation-induced measurement system, in accordance with an embodiment.

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as experimentation, exploration, drilling, logging, extraction, transportation, refinement, retail, and so forth. During exploration, and drilling, wellbores may be drilled into the ground for reasons that may include discovery, observation, or extraction of resources. These resources may include oil, gas, water, or any other combination of elements within the ground.

Wellbores, sometimes called boreholes, may be straight or curved holes drilled into the ground from which resources may be discovered, observed, or extracted. During and/or after the establishment of a wellbore, well logging may be practiced. Well logging may include making a detailed record of the geological formations penetrated by a wellbore, and is generally part of the discovery and observation of resources.

The exploration of what lies beneath the ground may be accomplished by a number of methods including surface and downhole techniques. The discovery and observation of resources using downhole techniques generally takes place down in the wellbore. In many implementations, downhole tools may include a nuclear radiation source (e.g., a neutron, x-ray, or gamma ray source) to impart high-energy radiation into the environment (e.g., the wellbore and geological formation). In one embodiment, the radiation source may produce neutrons, for example, via a pulsed neutron generator (PNG). The high energy neutrons may scatter inelastically or elastically off nuclei in the materials surrounding the downhole tool. Some inelastic scattering may result in the emission of gamma rays. Neutrons may slow down through elastic or inelastic scattering and may reach epithermal or thermal energy and eventually be captured by nuclei in the materials surrounding the tool. The neutron capture may result in the emission of gamma rays, the energies of which may vary depending on the type of element that emitted the gamma ray. These gamma-rays may then be detected by one or more detectors. Additionally, the emitted neutrons may bounce back from the environment and be detected by one or more neutron detectors. These gamma-ray and/or neutron detections may then be analyzed to determine characteristics of the environment. Additionally, the delay between neutron emission from the generator and neutron and/or gamma ray detection by the detector may be affected by the properties of the environment, such as density, porosity, and/or lithology. Furthermore, nuclear radiation may pass through a casing of a wellbore allowing for measurements of the formation in a cased wellbore.

Production of the formation may be directly affected by the gas pressure in the formation at the location of extraction within the wellbore. For example, a higher gas pressure may result in higher rates of production of the natural resources within the formation. In general, gas pressure measurements are usually obtained in an open wellbore environment and/or, if the wellbore is cased, at locations of perforations in the casing. However, once the wellbore is cased, it may become difficult to obtain direct gas pressure measurements of the formation at different locations within the wellbore. For example, it may be desired to take gas pressure measurements at multiple locations in the wellbore without perforating the casing at each location. Furthermore, the gas pressure at a particular location in the formation may change over time, for example due to production in another location of the formation and/or wellbore. As such, estimating the gas pressure within the formation without perforating the casing may, for example, provide much needed information about future production, increase production efficiency, and/or reduce expenditures, both time and resources.

In one embodiment, a downhole tool utilizing a PNG may be placed at a location within a wellbore to obtain one or more independent measurements such neutron porosity, a neutron capture cross-section (sigma), and a fast-neutron cross-section (FNXS). Each of the measurements may be used, along with assumed properties of the formation, to obtain an estimate of the gas pressure at the location the measurements were obtained. Furthermore, the estimate from each of the independent measurements may be compared for congruency. If the estimates agree with each other, the confidence in the estimate may be increased, and if the estimates do not agree, one or more of the assumptions may be altered and the estimates recomputed. The estimated gas pressure may be used to determine if production at a specific location within the formation should be accomplished and/or to determine the most effective location within the wellbore to initiate production.

With the foregoing in mind, FIG. 1 illustrates a well-logging system 10 that may employ the systems and methods of this disclosure. The well-logging system 10 may be used to convey a downhole tool 12 through a formation 14 (e.g., a geological formation) via a wellbore 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom-hole assembly (BHA) of a drill string, conveyed on a slickline or via coiled tubing, and so forth. For the purposes of this disclosure, the downhole tool 12 may be any suitable downhole tool that uses neutron and or neutron-induced gamma ray measurements within the wellbore 16 (e.g., downhole environment).

The downhole tool 12 may receive energy from an electrical energy device or an electrical energy storage device, such as the auxiliary power source 24 or another electrical energy source to power the tool. Additionally, in some embodiments the downhole tool 12 may include a power source within the downhole tool 12, such as a battery system or a capacitor to store sufficient electrical energy to activate the neutron source and record gamma-ray or neutron radiation.

Control signals 26 may be transmitted from a data processing system 28 to the downhole tool 12, and data signals 26 related to the downhole tool 12 measurements, such as the time spectra, may be returned to the data processing system 28 from the downhole tool 12. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the well-logging system 10 (e.g., incorporated with the logging winch system 20, the downhole tool 12, the downhole tool string, the bottom-hole assembly, etc.). Additionally, the data processing system 28 may be a remote device that analyzes data from multiple logging winch systems 20, a device located proximate to the drilling operation, or a combination thereof. In some embodiments, the data processing system 28 may be a mobile computing device (e.g., tablet, smart phone, or laptop) or a server remote from the logging winch system 20. The downhole tool 12 may be used in a wellbore 16 with or without a casing 38, which may include pipe, cement, or other materials.

Figure 2:
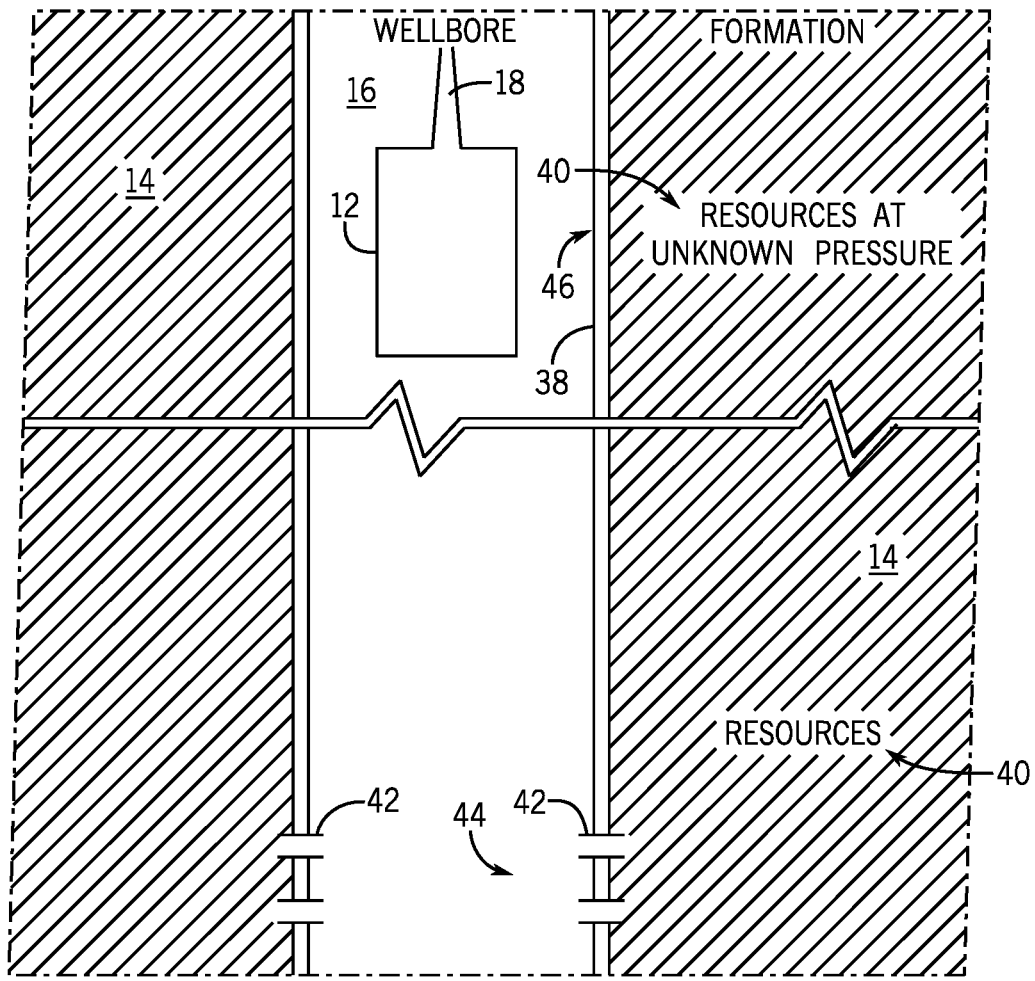
FIG. 2 is an illustration of a cased wellbore in geological formation with resources at a gas pressure to be determined by a downhole tool 12, in accordance with an embodiment.

As discussed above, some measurements, such as gas pressure measurements, at locations within the wellbore 16 may be generally taken in the open wellbore 16 without or before the introduction of the casing 38. However, after the casing 38 has been implemented within the wellbore 16, it may be difficult to obtain certain measurements of the formation 14 (e.g., the gas pressure measurement). Further, in some scenarios, the gas pressures at different locations within the formation 14 may change over time. For example, as depicted in FIG. 2, resources 40 (e.g., hydrocarbons) may be extracted via perforations 42 in the casing 38 at a first location 44 in the formation 14. However, as time progresses and/or as the resources 40 are extracted from the first location 44, the gas pressure at a second location 46 within the wellbore 16 may change, for example, from the open wellbore measurement. For example, the extraction of the resources 40 at the first location 44 may relieve the gas pressure at the second location 46.

Perforating the casing 38 to take a direct gas pressure measurement at the second location 46 and/or beginning a workover (e.g., a resource extraction process) may incur significant expenditure of time and/or materials. As such, estimating the gas pressure within the formation 14 without perforating the casing 38 may provide much needed information about future production and reduce expenditures. For example, if the gas pressure at the second location 46 is determined to be below a threshold, it may not be economical to pursue perforations 42 and/or a workover at the second location 46. However, if the gas pressure is determined to be above the threshold and/or is near a previous gas pressure measurement (e.g., an open wellbore measurement), a workover of the formation 14 at the second location 46 may economical.

Figure 3:
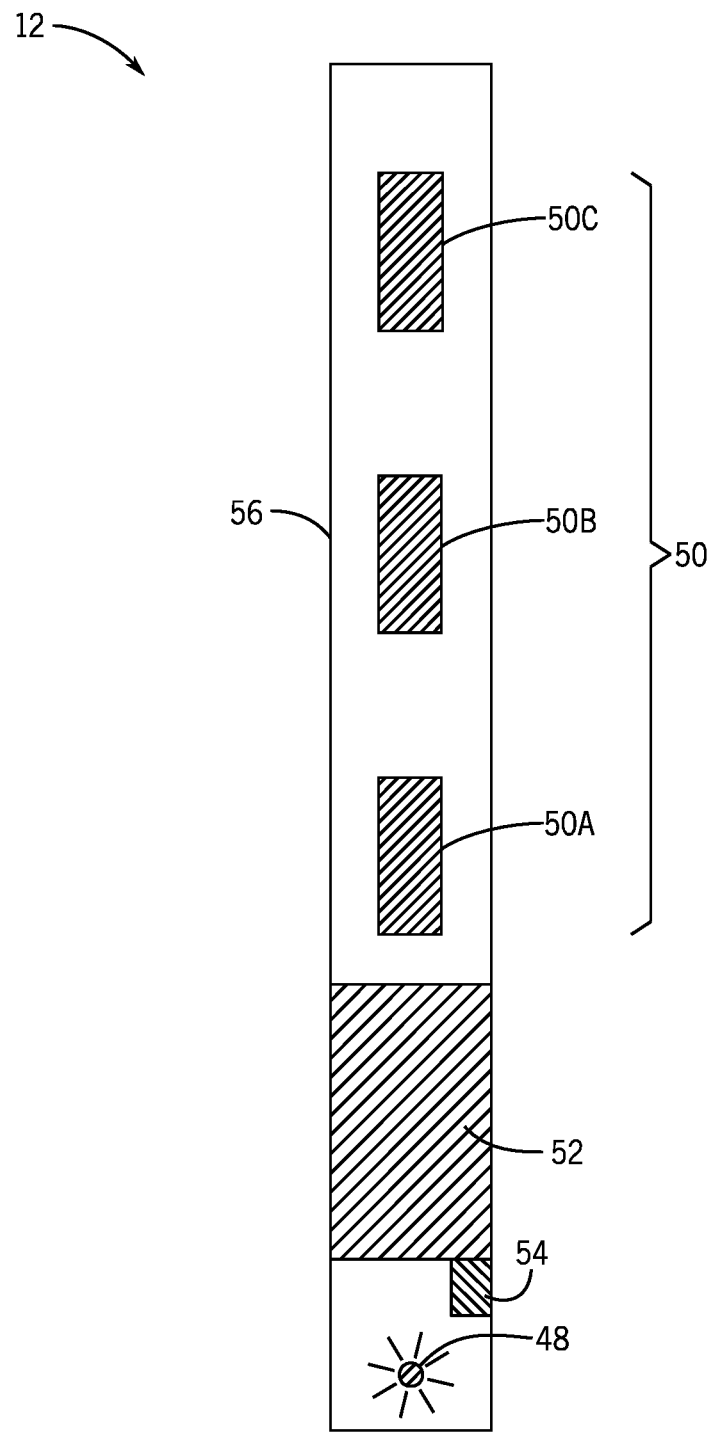
FIG. 3 is an example of a radiation-induced measurement downhole tool, in accordance with an embodiment.

In determining the gas pressure, measurements may be made in the wellbore 16 using the downhole tool 12 and interpolated to obtain a gas pressure estimate in the formation 14. As depicted in FIG. 3, the downhole tool 12 may include a radiation source 48 (e.g., a neutron radiation source) and one or more neutron and/or gamma ray detectors 50 (e.g., gas proportional detectors, scintillation neutron or gamma ray detectors, etc.). In one embodiment, the downhole tool 12 may include multiple detectors spaced at different distances from the radiation source 48. For example, the downhole tool 12 may include a near detector 50A, a middle detector 50B, and/or a far detector 50C. The detectors 50 may include gain-stabilized detectors, non-gain-stabilized detectors, or a combination thereof. Additionally, the radiation source 48 and detector(s) 50 may be separated by a neutron/gamma-ray shield 52. The shield 52 may prevent or reduce emitted radiation (e.g., neutrons or gamma rays) from directly affecting the detectors 50 and/or minimize oversaturation. In some embodiments, a radiation monitor 54 may be implemented near the radiation source 48 to measure the output flux of the radiation source 48. Additionally or alternatively, the output of the radiation source 48 may be determined based on operating parameters of the radiation source 48 such as voltage, beam current, temperature, and/or calibration. In one embodiment, the radiation source 48, detector(s) 50, radiation monitor 54, and shield 52 are enclosed in a housing 56; however, the components may also be employed in separate housings. The radiation source 48 may be of any suitable type such as a neutron generator (e.g., pulsed neutron generator (PNG)) that produces pulsed neutrons of sufficiently high energy for the desired function. When placed into the wellbore 16 and activated, the radiation source 48 may emit high-energy neutrons into the surrounding formation 14 in multiple directions. These high-energy neutrons may interact with nuclei in the surrounding area in events including inelastic scattering, elastic scattering, and neutron capture, and may generate secondary (neutron-induced) gamma rays as a consequence of inelastic scattering or neutron capture. Neutrons may also be scattered back and detected by a neutron detector 50. Alternatively or additionally, gamma rays may be detected by a gamma ray detector 50.

Figure 4:
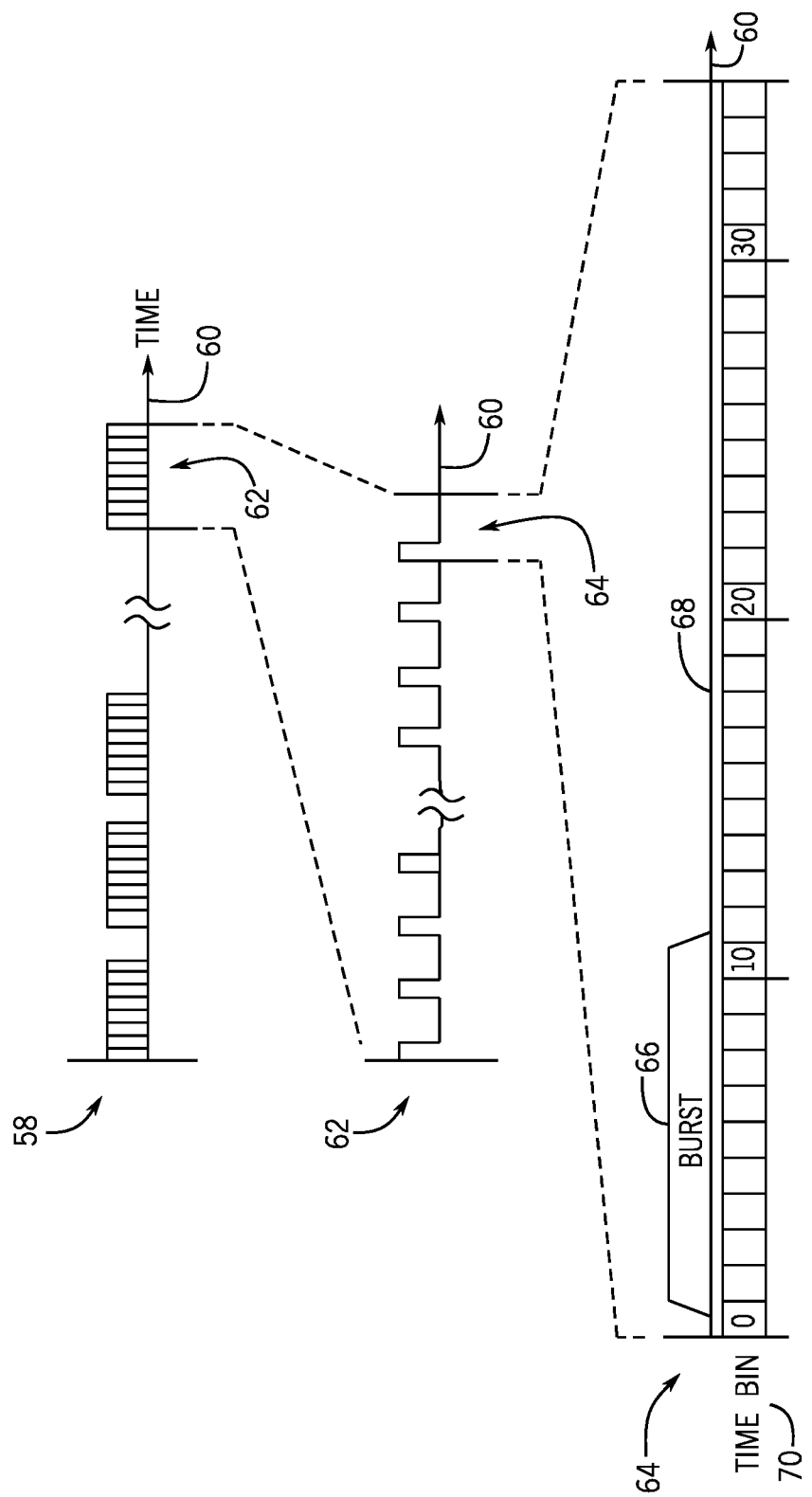
FIG. 4 is a plot of a neutron emission pulse sequence, in accordance with an embodiment.

The radiation source 48 may emit the high-energy neutrons in a pulsing scheme 58, as illustrated in FIG. 4. The pulsing scheme 58, illustrated with respect to time 60, may include one or more packets 62. The packets 62 may include one or more pulses 64. In turn, the pulses 64 may include a neutron burst 66 and an "off" period 68. The neutron burst 66 may represent an "on" period of the radiation source 48 indicating a period of high-energy neutron emission. As such, the off period 68 may be a period of no or limited neutron emission between neutron bursts 66. In the illustrated embodiment, the pulse 64 may be broken down into time bins 70. Each time bin 70 may be used to illustrate a period in time 60 and may be any suitable arbitrary length. In one embodiment, each time bin 70 may correspond to 1 microsecond (μs). Additionally, the time 60 between pulses 64 and packets 62 may vary depending on the implementation of the downhole tool 12. The pulsing scheme 58 may also be set to separate the different types of interactions between neutrons and the nuclei in the material surrounding the downhole tool (e.g., elastic collisions, gamma rays induced by capture, gamma rays induced by inelastic collisions, etc.). Different pulsing schemes 58 may be used and/or adjusted to enhance the differentiation of one or more of these phenomena.

Additionally, the detectors 50 may be arranged at different distances from the radiation source 48 to further distinguish counts due to different types of interactions within the formation 14. Further, independent measurements such as sigma, a neutron porosity (TPHI), and a fast-neutron cross section (FNXS) may be obtained from, for example, the gamma ray counts. Moreover, each independent measurement may be used separately to determine the gas pressure, as each independent measurement relies on a different subset of the radiation counts detected by the one or more detectors 50. For example, the sigma measurement may be generally related to the decay of count detections after the neutron burst 66, during the off period 68. Moreover, the TPHI measurement may be generally related to a ratio of total counts between detectors 50 at different distances from the radiation source 48 over time 60, and the FNXS may generally relate to the number of radiation counts during the neutron burst 66 at, for example, the far detector 50C.

The independent measurements of sigma, TPHI, and FNXS generally follow linear volumetric mixing laws. That is, in a simplified model, if the formation 14 is composed of a rock matrix, water, and gas, the response equations for each independent measurement may be written as the linear combination of component responses due to each of the rock matrix, the water, and the gas. For example, EQ 1 depicts that the sigma measurement is a linear combination of component responses due to the components of sigma ($\Sigma$), such as the sigma of the rock matrix ($\Sigma_{ma}$), the sigma of the water ($\Sigma_w$), and the sigma of the gas ($\Sigma_{gas}$), $$\Sigma = (1-\phi)\Sigma_{ma} + S_w\phi\Sigma_w + (1-S_w)\phi\Sigma_{gas} \qquad \text{EQ. 1}$$

where $S_w$ is the water saturation and $\phi$ is the total porosity of the formation 14. TPHI and FNXS can be similarly broken down as depicted in EQs. 2 and 3, $$TPHI = (1-\phi)TPHI_{ma} + S_w\phi TPHI_w + (1-S_w)\phi TPHI_{gas} \qquad \text{EQ. 2}$$

$$FNXS = (1-\phi)FNXS_{ma} + S_w\phi FNXS_w + (1-S_w)\phi FNXS_{gas} \qquad \text{EQ. 3}$$

where $TPHI_{ma}$ is the TPHI of the rock matrix, $TPHI_w$ is the TPHI of the water, $TPHI_{gas}$ is the TPHI of the gas, $FNXS_{ma}$ is the FNXS of the rock matrix, $FNXS_w$ is the FNXS of the water, and $FNXS_{gas}$ is the FNXS of the gas.

In some embodiments, the above equations may be used to solve for, for example, the total porosity and/or water saturation. In such a case, multiple assumptions are made and the component responses are each calculated (e.g., from tables and/or a facilitating computer program). However, one such assumption may include the gas pressure such as the open wellbore gas pressure taken before casing the wellbore 16. As discussed herein, such a gas pressure assumption may be inaccurate, and, in accordance with an embodiment of the present disclosure, be determined by reversing the calculation flow and making assumptions about the formation 14 other than gas pressure. For example, the total porosity may be known or estimated based on open wellbore measurements, and the water saturation may be known or estimated based, for example, on open wellbore measurements and/or capillary pressure data.

The component responses may each depend on the composition of the rock matrix, water, and gas. For example, the rock matrix component responses (e.g., $\Sigma_{ma}$, $TPHI_{ma}$, and $FNXS_{ma}$) and the water component responses (e.g., $\Sigma_w$, $TPHI_w$, and $FNXS_w$) may vary based on the type of rock matrix (e.g., limestone, silica, etc.) and the composition of the water (e.g., salinity, compounds in solution, etc.), respectively, as well as physical properties such as density. The rock matrix component responses and the water component responses may be estimated from tables and/or a facilitating program based on assumed and/or known properties. Such assumptions may stem from open wellbore measurements, cased wellbore measurements (e.g., nuclear spectroscopy measurements), laboratory measurements, surface measurements, measurements in a separate wellbore of the formation 14, and/or any other suitable means of obtaining formation properties. Furthermore, each of the gas component responses (e.g., $\Sigma_{gas}$, $TPHI_{gas}$, and $FNXS_{gas}$) may be written as a function of the gas pressure, as illustrated by EQ. 4, $$X_{gas} = f(\text{Gas Pressure}) \qquad \text{EQ. 4}$$

where $X_{gas}$ is a generalized gas component response (e.g., $\Sigma_{gas}$, $TPHI_{gas}$, or $FNXS_{gas}$).

Figure 5:
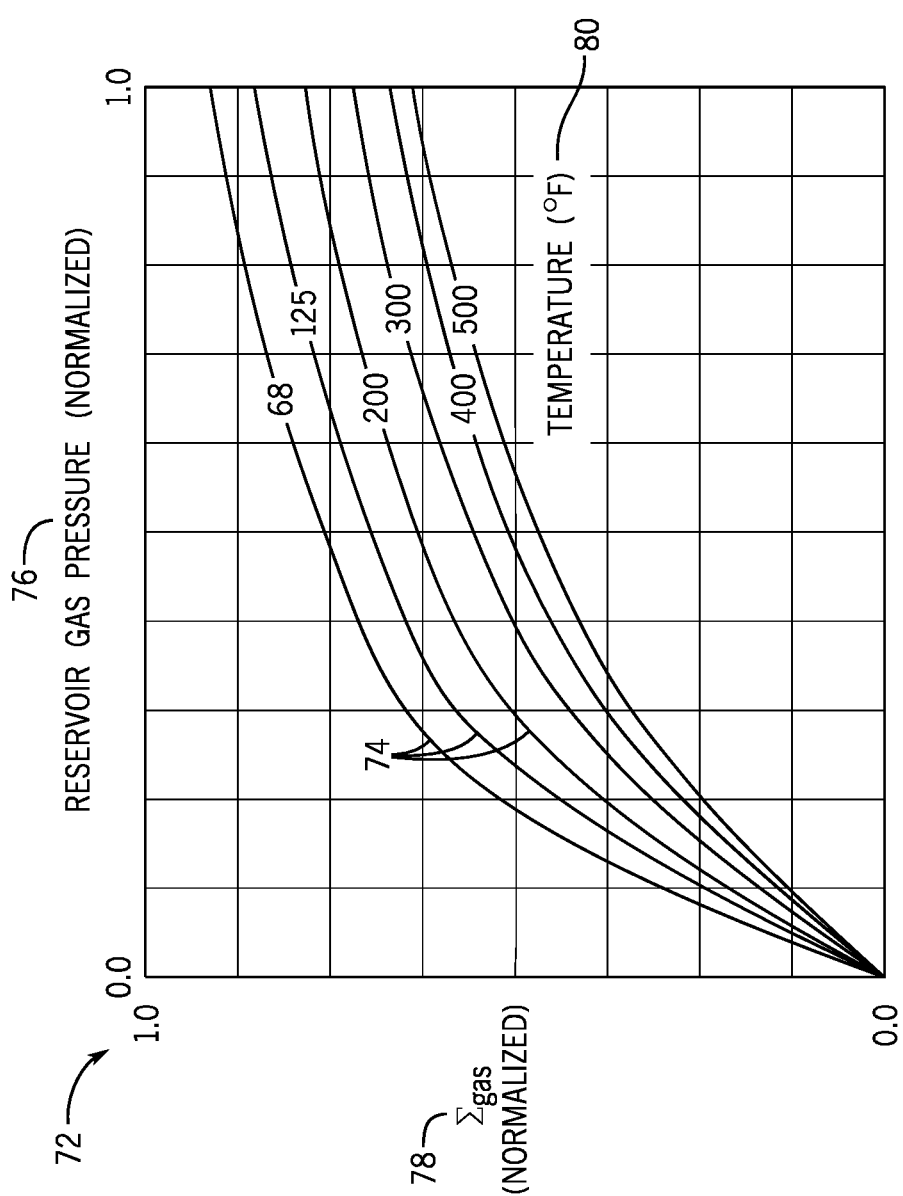
FIG. 5 is a plot of reservoir gas pressure versus a sigma gas component response at different temperatures, in accordance with an embodiment.

FIG. 5 is a plot 72 of multiple graphs 74 reservoir gas pressure 76 versus sigma gas component response 78 for various temperatures 80. As should be appreciated, the plot 72 is given as an example, and different relationships between the sigma gas component response 78, the reservoir gas pressure 76, and temperature 80 may occur depending on the equation of state of the gas and/or the chemical composition of the gas. Further, the plot 72 may be used, for example, in determining the reservoir gas pressure 76 via the independent measurement of sigma, and similar plots may be established for using the independent measurements of TPHI and/or FNXS. In determining the proper function of gas pressure (e.g., as shown in EQ. 4) to equate to the gas component response, an equation of state and chemical composition of the gas may be estimated. In one embodiment, the equation of state may be assumed to follow the ideal gas law or a version of the real gas law such as the gas density equation of EQ. 5, $$\rho_g = 28.967\gamma_g P/zRT \qquad \text{EQ. 5}$$

where $\rho_g$ is the gas density, $\gamma_g$ is the specific gravity for the gas, P is the gas pressure, z is the compressibility factor, R is the gas-law constant, and T is the temperature 80. In addition to the equation of state, the chemical composition may be assumed to, for example, provide quantities for the material variables (e.g., the specific gravity and compressibility factor). In some embodiments, the chemical composition and/or the equation of state may be assumed based on pressure, volume, and temperature (PVT) measurements from the open wellbore measurements, or any other suitable process.

A computer program (e.g., SNUPAR, a nuclear parameter code produced by Schlumberger Ltd. or other suitable program) may take as inputs the gas density, pressure, and temperature or other complementary parameters and output the gas component response. In one embodiment, the temperature may be estimated or measured in the wellbore 16 and a range of gas pressures (e.g., from a high pressure as measured in the open wellbore 16 to a low pressure corresponding to depletion) are evaluated. Each gas pressure, along with the temperature, may be substituted into the equation of state, such as EQ. 5, to determine the gas density. The range of gas pressures and corresponding gas densities, along with the temperature, may be input into the computer program to output a range of gas component responses, and an equation may be fitted to the ranges of the gas pressure and the gas component responses. Further, a fitted equation may be generated for each of the gas component responses (e.g., $\Sigma_{gas}$, $TPHI_{gas}$, or $FNXS_{gas}$). The fitted equation represents the relationship between the reservoir gas pressure 76 and the gas component response at a given temperature 80 such as a graph 74 of the plot 72.

The fitted equation corresponding to the assumed properties of the formation 14 for one or more of the gas component responses, $\Sigma_{gas}$, $TPHI_{gas}$, and $FNXS_{gas}$ may be substituted into EQs. 1, 2, and 3, respectively, to yield relationships between the independent measurements and the reservoir gas pressure 76, and the relationship may be arranged to solve for the reservoir gas pressure 76 in terms of the independent measurements. In one embodiment, the reservoir gas pressure 76 may be obtained from one or more of the independent measurements. If obtained from multiple of the independent measurements, the reservoir gas pressures 76 may be compared for congruency. If the determined reservoir gas pressures 76 from two or more of the independent measurements are different, one or more of the assumed variables may be incorrect. In one embodiment, the assumed variables may be fitted, within bounds of uncertainty, until the reservoir gas pressures 76 from the multiple independent measurements are approximately equal (e.g., within a statistical range of uncertainty). Moreover, in some embodiments, the reservoir gas pressure 76 and a separate variable (e.g., water saturation) may be solved for simultaneously by using two independent measurements. As will be appreciated, each independent measurement used may increase the number of unknowns that may be determined.

Additionally or alternatively, time-lapsed logging of the wellbore 16 (e.g., at the second location 46 may further decrease the uncertainty in the determined reservoir gas pressure 76. For example, periodic determination of the reservoir gas pressure 76 (e.g., over a time period of production at a different location (e.g., the first location 44) in the formation 14) may eliminate or reduce the input assumptions to the gas pressure relationships discussed above. In one embodiment, if changes in sigma, TPHI, and/or FNXS are noted, the change may be assumed to be due to a change in the gas pressure (e.g., assuming no water encroachment in the area of interest). In such an embodiment, the uncertainty of the rock matrix and water component responses may cancel out, and, thus, a reduction in uncertainty may be obtained.

Figure 6:
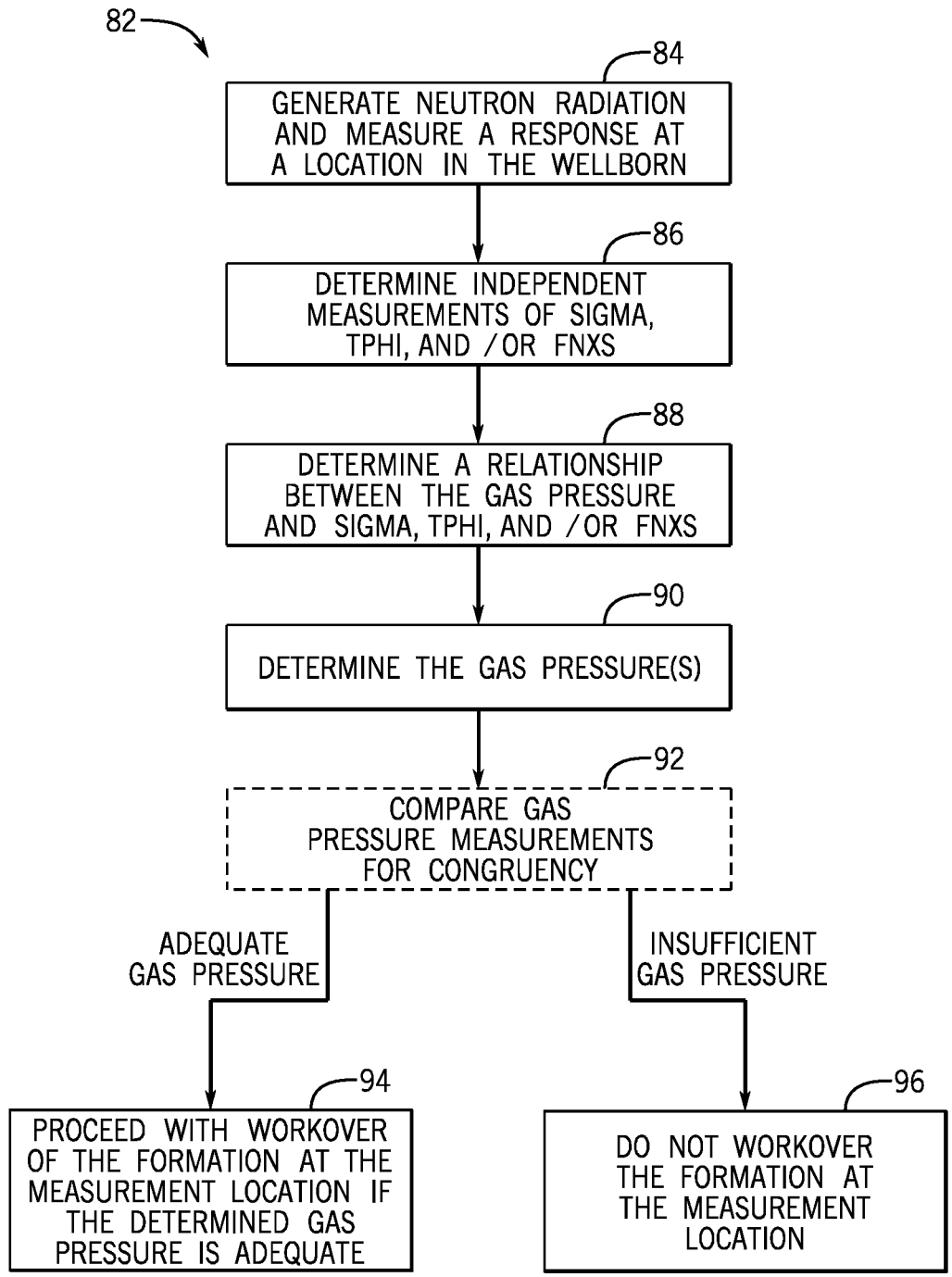
FIG. 6 is a flowchart of an example process for determining whether or not to proceed with a workover of a formation, in accordance with an embodiment.

To help further illustrate, FIG. 6 is a flowchart 82 depicting an example process for determining whether or not to proceed with a workover of a formation 14 at a location (e.g., the second location 46) in the wellbore 16 based at least on a determined gas pressure. Neutron radiation may be generated at a location within the wellbore 16 and the response to the neutron radiation measured (e.g., by one or more detectors 50) (process block 84). Independent measurements (e.g., based on the measured response) of sigma, TPHI, and/or FNXS may be determined (process block 86). Additionally, a relationship between the gas pressure at the location and the sigma, the TPHI, and/or the FNXS may be determined (process block 88), and the gas pressure may be determined at the location (process block 90). If more than independent measurements is used to determine separate gas pressures, the gas pressures may be compared for congruency (process block 92). If the gas pressure is adequate (e.g., economical for production) a workover of the formation 14 may proceed at the measurement location (process block 92). If the gas pressure is insufficient (e.g., not economical for production), a workover may be declined to proceed at the measurement location (process block 94).

Figure 7:
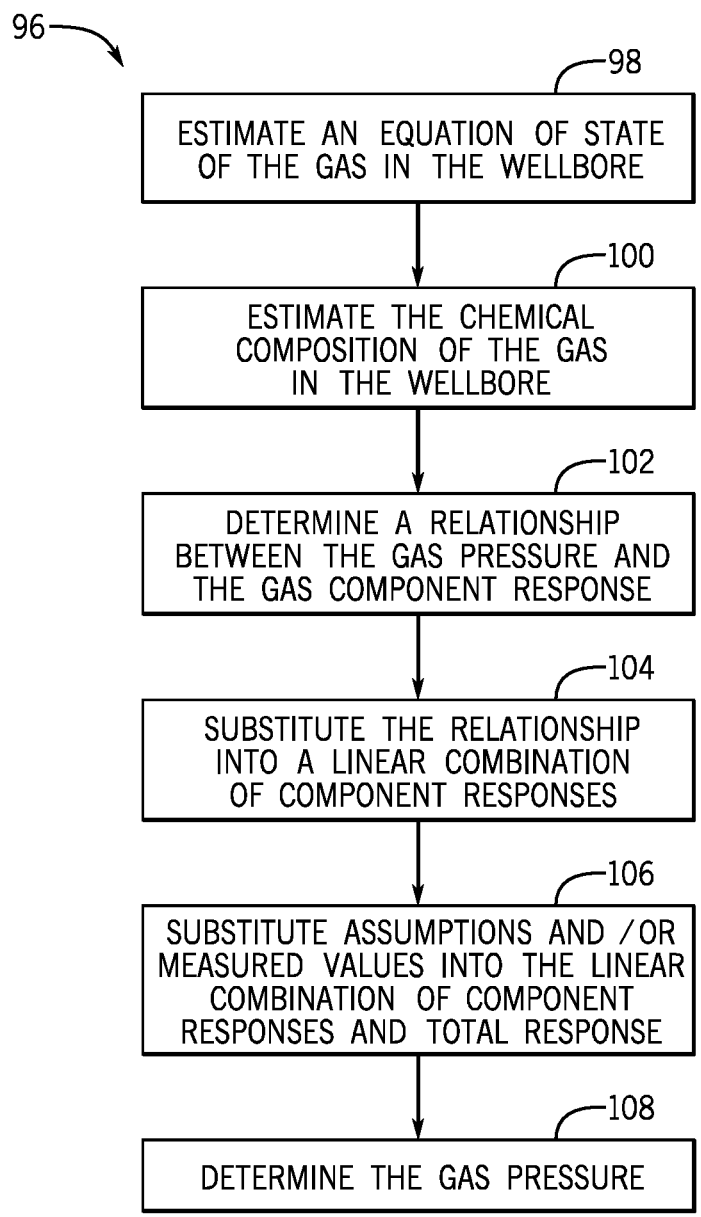
FIG. 7 is a flowchart depicting an example process for determining a relationship between a gas pressure and radiation-induced measurements, in accordance with an embodiment.

Further, FIG. 7 is a flowchart 96 depicting an example process for determining the relationship between the gas pressure and the sigma, the TPHI, and/or the FNXS (process block 88) and determining the gas pressure (process block 90). An equation of state may be estimated for the gas in wellbore (process block 98), for example, via previous measurements (e.g., open wellbore measurements). Additionally, the chemical composition of the gas in the wellbore may be estimated (process block 100). A relationship between the gas pressure and a gas component response (e.g., $\Sigma_{gas}$, $TPHI_{gas}$, or $FNXS_{gas}$) may be determined (process block 102), for example, via a computer program and/or a table corresponding to the estimated chemical composition and/or equation of state. The relationship may be substituted into a linear combination of component responses (e.g., EQs. 1-3) (process block 104). Further, assumptions and/or measured values may be substituted into the linear combination of component responses and the total response (process block 106). The gas pressure may then be determined (process block 108), for example by solving the linear combination of component responses for the gas pressure.

Although the above referenced flowcharts 82, 96 are shown in a given order, in certain embodiments, the depicted steps may be reordered, altered, deleted, and/or occur simultaneously. Additionally, the referenced flowcharts 82, 96 are given as illustrative tools, and further decision and/or process blocks may be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A downhole tool system comprising:
a radiation source configured to emit neutron radiation at a location within a cased wellbore of a geological formation;
a radiation detector configured to determine nuclear radiation at the location within the cased wellbore, wherein the nuclear radiation is based at least in part on nuclear interactions between the neutron radiation and the geological formation; and
processing circuitry configured to:
determine a sigma, a neutron porosity, a fast-neutron cross-section, or a combination thereof, of the geological formation at the location based at least in part on feedback received from the radiation detector indicative of the nuclear radiation at the location within the cased wellbore; and
estimate a gas pressure of the geological formation at the location based at least in part on the sigma, the neutron porosity, the fast-neutron cross-section, or a combination thereof
wherein the processing circuitry is configured to estimate the gas pressure at least in part by:
determining a first estimation of the gas pressure based at least in part on a first one of the sigma, the neutron porosity, and the fast-neutron cross-section; and determining a second estimation of the gas pressure based at least in part on a second one of the sigma, the neutron porosity, and the fast-neutron cross-section, and wherein the first estimation, the second estimation, or both are determined based at least in part on assumptions of physical properties of the geological formation at the location based at least in part on additional measurements received by the processing circuitry.

2. The downhole tool system of claim 1, wherein the processing circuitry is configured to determine at least two of the sigma, the neutron porosity, and the fast-neutron cross-section based at least in part on the feedback indicative of the nuclear radiation at the location within the cased wellbore.

3. The downhole tool system of claim 1, wherein the first estimation and the second estimation are determined independently of one another.

4. The downhole tool system of claim 1, wherein the additional measurements comprise open wellbore measurements taken before casing of the cased wellbore, and wherein the open wellbore measurements comprise a total porosity, a water saturation, or both.

5. The downhole tool system of claim 1, wherein the processing circuitry is configured to:
compare the first estimation and the second estimation to one another; and
in response to the first estimation and the second estimation being different outside a statistical range of uncertainty:
revise the assumptions of the physical properties;
revise the first estimation based at least in part on the revised assumptions; and
revise the second estimation based at least in part on the revised assumptions.

6. The downhole tool system of claim 1, wherein the processing circuitry is configured to estimate an equation of state of a gas within the geological formation at the location to estimate the gas pressure of the gas.

7. The downhole tool system of claim 1, wherein the radiation source comprises a pulsed neutron generator.

8. The downhole tool system of claim 1, wherein the nuclear radiation comprises gamma ray counts.

9. A non-transitory, machine-readable storage medium comprising instructions that, when executed by a processor, cause the processor to:
receive first data comprising a sigma, a neutron porosity, a fast-neutron cross-section, or a combination thereof of a geological formation based at least in part on radiation detections in a cased wellbore of the geological formation;
estimate physical properties of the geological formation based at least in part on second data associated with the geological formation;
determine a relationship between a gas pressure at a location in the geological formation and at least one of the sigma, the neutron porosity, and the fast-neutron cross-section based at least in part on the estimated physical properties;
estimate the gas pressure based at least in part on the first data and the relationship;
compare a first estimate of the gas pressure based at least in part on a first one of the sigma, the neutron porosity, and the fast-neutron cross-section to a second estimate of the gas pressure based at least in part on a second one of the sigma, the neutron porosity, and the fast-neutron cross-section; and
based at least in part on the comparison, determine a confidence corresponding to the estimated gas pressure.

10. The non-transitory, machine-readable storage medium of claim 9, wherein the first data and the second data are obtained without perforating a casing of the cased wellbore at the location.

11. The non-transitory, machine-readable storage medium of claim 9, wherein when executed by the processor, the instructions cause the processor to estimate an equation of state of a gas in the geological formation based at least in part on the estimated physical properties of the geological formation, and wherein the relationship is based at least in part on the equation of state.

12. The non-transitory, machine-readable storage medium of claim 9, wherein when executed by the processor, the instructions cause the processor to, in response to an incongruence between the first estimate and the second estimate, fit the estimated physical properties such that the first estimate and the second estimate are within a statistical range of uncertainty.

13. The non-transitory, machine-readable storage medium of claim 9, wherein the first data comprises a gas component response of the sigma, the neutron porosity, the fast-neutron cross-section, or a combination thereof.

14. A method comprising:
generating, via a downhole tool, neutron radiation in a cased wellbore of a geological formation;
measuring, via the downhole tool, a response to the neutron radiation;
determining, via a processor, at least one of a sigma, a neutron porosity, or a fast-neutron cross-section of the geological formation based at least in part on the response to the neutron radiation;
estimating, via the processor, an equation of state of a gas in the geological formation;
determining, via the processor, a gas pressure of the gas in the geological formation based at least in part on a relationship between the gas pressure of the gas and the at least one of the sigma, the neutron porosity, or the fast-neutron cross-section, wherein the relationship is based at least in part on the equation of state of the gas; and
periodically determining the gas pressure at a first location of the geological formation during production at a second location of the geological formation.

15. The method of claim 14, wherein determining the gas pressure of the gas in the geological formation comprises determining a plurality of gas pressure estimates, wherein each gas pressure estimate of the plurality of gas pressure estimates is based at least in part on one of the sigma, the neutron porosity, and the fast-neutron cross-section.

16. The method of claim 15, comprising:
comparing the plurality of gas pressure estimates to one another; and
determining a confidence in the determined gas pressure of the gas based at least in part on the comparison.

17. The method of claim 14, comprising:
comparing the determined gas pressure to a threshold; and
performing a workover of the geological formation in response to the determined gas pressure being greater than the threshold.

* * * * *